J. K. MACDONALD.
Adjustable Hooks and Railway Ticket-Holders.

No. 147,278.              Patented Feb. 10, 1874.

Witness
Horace Harris
Joseph Hassell

Inventor
John K. Macdonald

UNITED STATES PATENT OFFICE

JOHN K. MACDONALD, OF NEWARK, NEW JERSEY.

IMPROVEMENT IN ADJUSTABLE HOOKS AND RAILWAY-TICKET HOLDERS.

Specification forming part of Letters Patent No. 147,278, dated February 10, 1874; application filed March 21, 1873.

*To all whom it may concern:*

Figure 1:
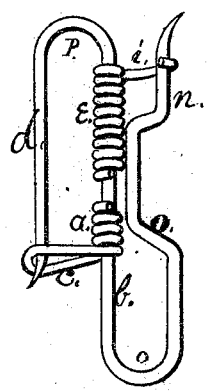
Figure 2:
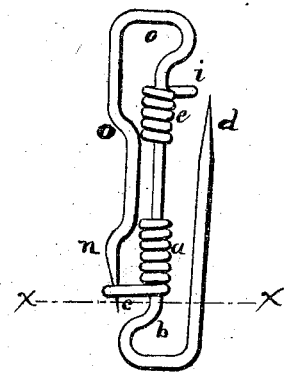
Figure 3:

Be it known that I, JOHN K. MACDONALD, of Newark, in the county of Essex and State of New Jersey, have invented a Combination Adjustable Hook and Railroad-Ticket Holder, of which the following is a specification:

Figure 1 shows a general view of the hook and holder; Fig. 2, a modification of the device, and Fig. 3 a cross-section of Fig. 2 on the line of $x\ x$.

The first part of my invention consists in an improvement on my security-hook, patented January 28, 1873. In that the coil of wire was made fast to the shank near the lower end, and out of that wire was made the hook for the pin. In this the coil is in two parts. The lower part, $a$, is coiled loosely about the shank $b$, and, instead of a hook, there is a loop, $c$, made by the end of the wire going back against the shank; and, to release the pin $d$, the coil is slipped down on the shank, and the loop slips off from the end of the pin, and the reverse action is required to hook the pin. The shank is made with loops $o$ and $p$, and, at either end, bent back from the base line of the shank, to cover in part the point of pin $d$ and hook $i$.

The second part of this invention is also an improvement on the former security-hook. In that the security was in the spring-coil coming up in contact with the hook, which coil was required to be pressed or drawn down before any article could be passed on or off the hook.

In my present improvement, the coil $e$ is wound close about the shank, made of wire nearly square, so that it will not slip, and the upper end of the coil-wire forms a hook, $i$, to receive the end of the hook $n$, after an eye-glass or other article has been put on it, and the hook $i$ makes the security positive in that way; or this coil, like the coil $a$, may be put on the shank loosely, and, instead of the hook $i$, there may be a loop like the loop $c$, and the hooking and unhooking of the hook $n$ is by sliding the coil, as in the other case.

The third part of my invention is a new feature; and consists, first, in bending the hook $n$ in the middle, so that a flat part shall press, when hooked, against the coil $e$ or shank, for the purpose of holding a railroad-ticket when traveling. The angle $o$ serves also as a means of security for any article put on that hook. The invention consists, second, in making the end of the hook $n$ sharp, for going through a railroad-ticket, or other article to be carried in that way.

I claim—

1. The loop $c$ and loose coil $a$, made to slide on the shank $b$, substantially as and for the purposes specified.

2. The coil $e$ and hook $i$, in combination with the shank $b$ and hook $n$, substantially as and for the purposes specified.

3. The hook $n$, made sharp at the upper end, and bent in the middle nearly at right angles with a line of itself, when, by passing the end of the same under the hook or loop $i$, it is made to press against the shank $b$, substantially as and for the purpose specified.

4. The adjustable hook and railroad-ticket holder, consisting of the shank $b$, pin $d$, hook $n$, and coils $c$ and $e$, substantially as and for the purpose set forth.

JOHN K. MACDONALD.

Witnesses:
HORACE HARRIS,
JOSEPH HASSELL.